United States Patent
Lee et al.

(10) Patent No.: US 9,755,871 B1
(45) Date of Patent: Sep. 5, 2017

(54) METHOD OF DEMODULATING CONTROL CHANNEL AND DATA CHANNEL IN WIRELESS COMMUNCIATION SYSTEM AND APPARATUS THEREFOR

(71) Applicant: LG ELECTRONICS INC., Seoul (KR)

(72) Inventors: Sangrim Lee, Seoul (KR); Hojae Lee, Seoul (KR); Dongkyu Kim, Seoul (KR); Kwangseok Noh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/448,448

(22) Filed: Mar. 2, 2017

Related U.S. Application Data

(60) Provisional application No. 62/302,718, filed on Mar. 2, 2016.

(51) Int. Cl.
  *H04B 15/00* (2006.01)
  *H04L 27/14* (2006.01)
  *H04L 25/02* (2006.01)

(52) U.S. Cl.
  CPC .......... *H04L 27/14* (2013.01); *H04L 25/0204* (2013.01)

(58) Field of Classification Search
  CPC .......... H04B 1/16; H04B 7/155; H04B 17/00; H04W 72/04; H04W 72/042;
  (Continued)

(56) References Cited

U.S. PATENT DOCUMENTS

| | | | |
|---|---|---|---|
| 2013/0094543 A1* | 4/2013 | Zhang | H04L 25/0204 375/219 |
| 2014/0314000 A1* | 10/2014 | Liu | H04W 72/042 370/329 |

(Continued)

*Primary Examiner* — Thanh Le
(74) *Attorney, Agent, or Firm* — Lee, Hong, Degerman, Kang & Waimey

(57) ABSTRACT

A method of demodulating a channel by a user equipment in a wireless communication system, include the steps of receiving information including a total power value of reference signals (RSs), a power difference value between power of a first RS for control information and a power of a second RS for data among the RSs, a port number of an additional RS, a cyclic shift (CS) value of the additional RS, and a power value of the additional RS and a power difference value between second RSs for the control information, performing channel estimation on a first channel on which the additional RS is received and a second channel received from a port identical to the port number of the additional RS and the second channel on which the first RS to which a CS value different from the CS value of the additional RS is applied is received, obtaining a power difference value between the power of the additional RS and the power of the first RS based on the channel estimation of the first and the second channels, and determining a number of rank of the second RS based on the total power value of the RSs, the power value of the additional RS, a power difference value between the power of the first RS and the power of the second RS, the obtained power difference value between the power of the additional RS and the power of the first RS, and the power difference value between the power of the second RSs.

18 Claims, 14 Drawing Sheets

(58) Field of Classification Search
CPC .. H04W 84/047; H04L 5/0023; H04L 5/0048; H04L 5/0044; H04L 5/0051; H04L 5/0204; H04L 7/14
See application file for complete search history.

(56) References Cited

U.S. PATENT DOCUMENTS

| | | | |
|---|---|---|---|
| 2015/0036612 A1* | 2/2015 | Kim ................. | H04B 17/00 370/329 |
| 2015/0098440 A1* | 4/2015 | Yang ................ | H04L 5/0051 370/330 |
| 2016/0006521 A1* | 1/2016 | Yoshimoto ........ | H04W 8/24 375/267 |
| 2016/0081033 A1* | 3/2016 | Ouchi ............... | H04L 5/14 455/522 |

\* cited by examiner

METHOD OF DEMODULATING CONTROL CHANNEL AND DATA CHANNEL IN WIRELESS COMMUNCIATION SYSTEM AND APPARATUS THEREFOR

CROSS-REFERENCE TO RELATED APPLICATION

Pursuant to 35 U.S.C. §119(e), this application claims the benefit of U.S. Provisional Application No. 62/302,718, filed on Mar. 2, 2016, the contents of which are all hereby incorporated by reference herein in its entirety.

BACKGROUND OF THE INVENTION

Field of the Invention

The present invention relates to a wireless communication, and more particularly, to a method of demodulating a control channel and a data channel in a wireless communication system and an apparatus therefor.

Discussion of the Related Art

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

However, the legacy frame structure of 1 ms TTI is unable to satisfy the 1 ms data requirement latency. 5G aims to provide data latency reduced as much as 10 times compared to the legacy data latency.

SUMMARY OF THE INVENTION

Accordingly, the present invention is directed to an apparatus and method thereof that substantially obviate one or more problems due to limitations and disadvantages of the related art.

A technical task of the present invention is to provide a method for a user equipment to demodulate a channel in a wireless communication system.

Another technical task of the present invention is to provide a user equipment for demodulating a channel in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of demodulating a channel by a user equipment in a wireless communication system, includes the steps of receiving, from an eNB information including a total power value of reference signals (RSs), a power difference value between a power of a first reference signal for control information and a power of a second reference signal for data among the reference signals, a port number of an additional reference signal, a cyclic shift (CS) value of the additional reference signal, and a power value of the additional reference signal, performing channel estimation on a first channel on which the additional reference signal is received and a second channel received from a port identical to the port number of the additional reference signal and the second channel on which the first reference signal to which a CS value different from the CS value of the additional reference signal is applied is received, obtaining a power difference value between the power of the additional reference signal and the power of the first reference signal based on the channel estimation of the first and the second channels, and determining a number of rank of the second reference signal based on the total power value of the reference signals, the power value of the additional reference signal, the power difference value between the power of the first reference signal and the power of the second reference signal, the obtained power difference value between the power of the additional reference signal and the power of the first reference signal, and the power difference value between the second reference signals.

The determining step can further include the steps of determining a remaining power value by subtracting the power value of the additional reference signal from the total power of the reference signals, and determining a number of rank of the second reference signal using a power difference value between the remaining power value, the power difference value between the power of the first RS and the power of the second RS, the obtained power difference value between the power of the additional reference signal and the power of the first reference signal, and the power difference value between the second reference signals.

The method can further include the step of demodulating a control channel and a data channel based on the determined number of rank of the second reference signal.

If the determined number of rank of the second reference signal corresponds to a plural number, CS values applied to a plurality of the second reference signals may be different from each other. The first reference signal and the second reference signal may be received through a control channel. The information further includes information on a rank number of the first reference signal and the rank number of the second reference signal can be determined further based on the information regarding the number of rank of the first reference signal. The information may be configured per a frequency band. The frequency band may correspond to a frequency band of a resource block (RB) unit or a subband unit. The information may be configured per a subframe.

To further achieve these objects and other advantages and in accordance with the purpose of the invention, as embodied and broadly described herein, according to a different embodiment, a user equipment for modulating a channel in a wireless communication system includes a receiver configured to receive from, an eNB, information including a total power value of reference signals, a power difference value between a power of a first reference signal for control information and a power of second reference signal for data among the reference signals, a port number of an additional reference signal, a cyclic shift (CS) value of the additional reference signal, and a power value of the additional reference signal, and a power difference value between second RSs for the control information, and a processor configured to perform channel estimation on a first channel on which the additional reference signal is received and a second channel received from a port identical to the port number of the additional reference signal and the second channel on which the first reference signal to which a CS value different from the CS value of the additional reference signal is applied is received, the processor configured to obtain a power difference value between the power of the additional reference signal and the power of the first reference signal based on the channel estimation of the first and the second channels, the processor configured to determine a number of rank of the second reference signal based on the total power value of the reference signals, the power value of the additional reference signal, a power difference value between the power of the first reference signal and the power of the second reference signal, the obtained power difference value between the power of the additional reference signal and the power of the first reference signal, and the power difference value between the second RSs.

The processor is configured to determine a remaining power value by subtracting the power value of the additional reference signal from the total power of the reference signals and configured to determine the number of rank of the second reference signal using the remaining power value, the power difference value between the power of the first RS and the power of the second RS, the obtained power difference value between the power of the additional RS and the power of the first RS, and the power difference value between the second RS.

The processor is configured to demodulate a control channel and a data channel based on the determined number of rank of the second reference signal. If the determined number of rank of the second reference signal corresponds to a plural number, CS values applied to the second reference signals may be different from each other. The receiver may be configured to receive the first reference signal and the second reference signal through a control channel. The information further includes information regarding the number of rank of the first reference signal, and the processor may be configured to determine the number of rank of the second reference signal further based on the information regarding the number of rank of the first reference signal. The information may be configured per a frequency band. The frequency band may correspond to a frequency band of an RB unit or a subband unit. The information may be configured per a subframe.

According to the present invention, it is able to considerably reduce signaling overhead, which is necessary to be notified all the time, by finding out rank information for channel estimation through an additional RS.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
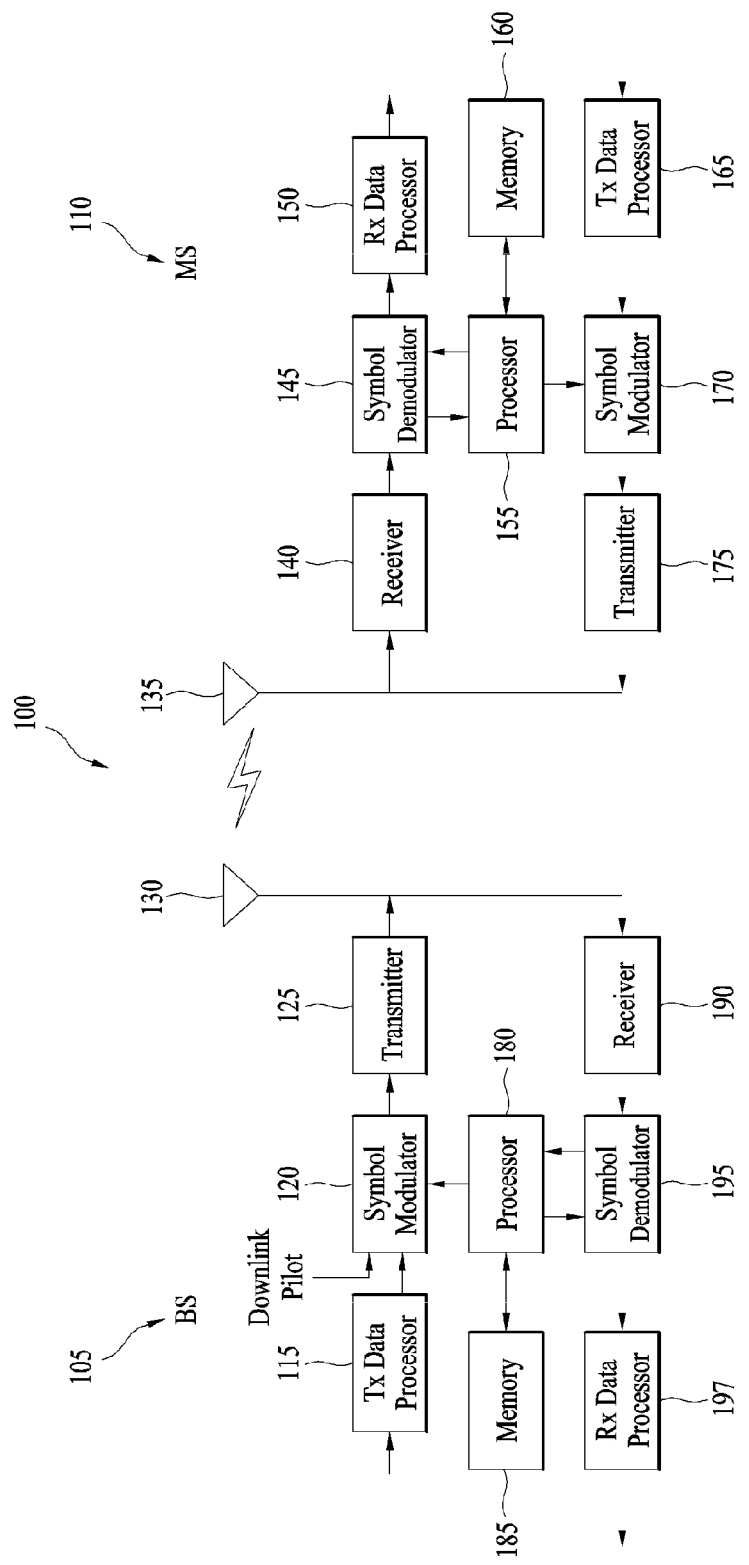
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system, 3GPP LTE-A, or 5G system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes new and various frame structures for a $5^{th}$ generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, massive connectivity (e.g., IoT).

Figure 2:
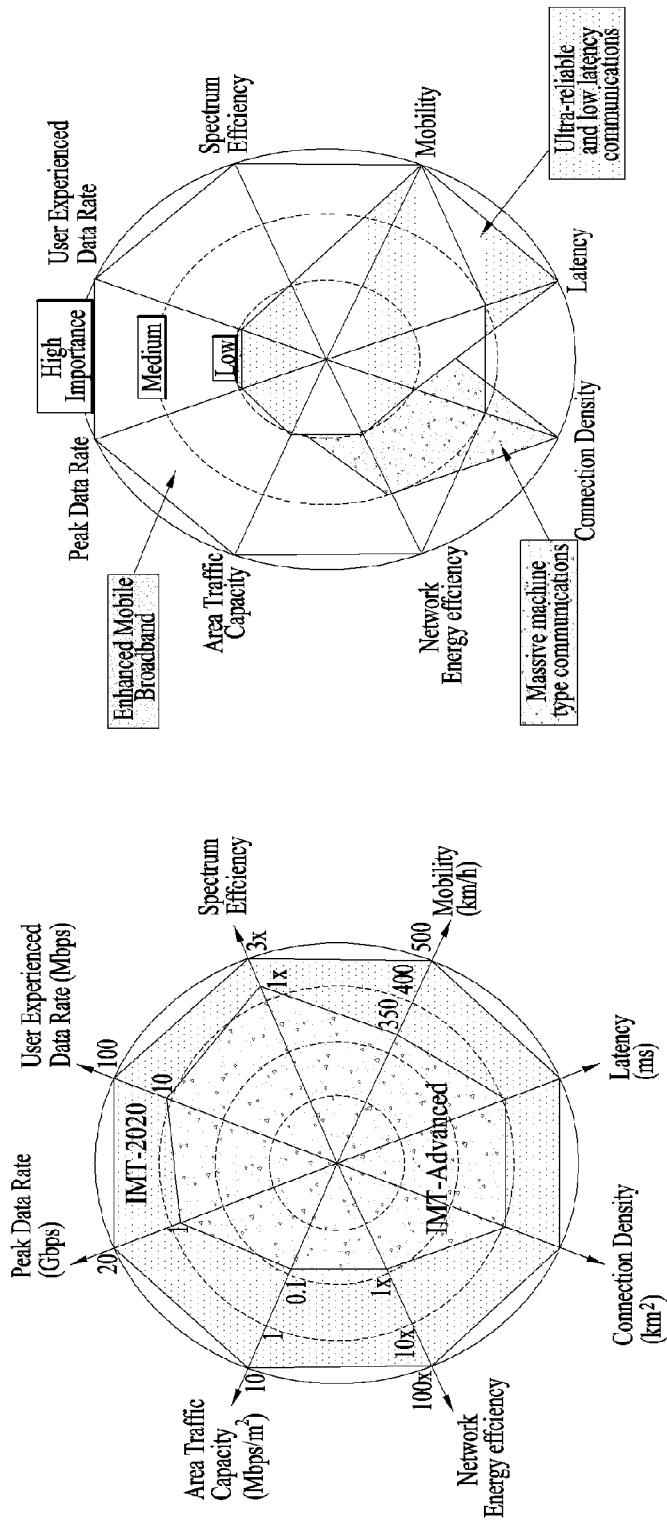
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 shows correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <$10^{-6}$).

Figure 3:
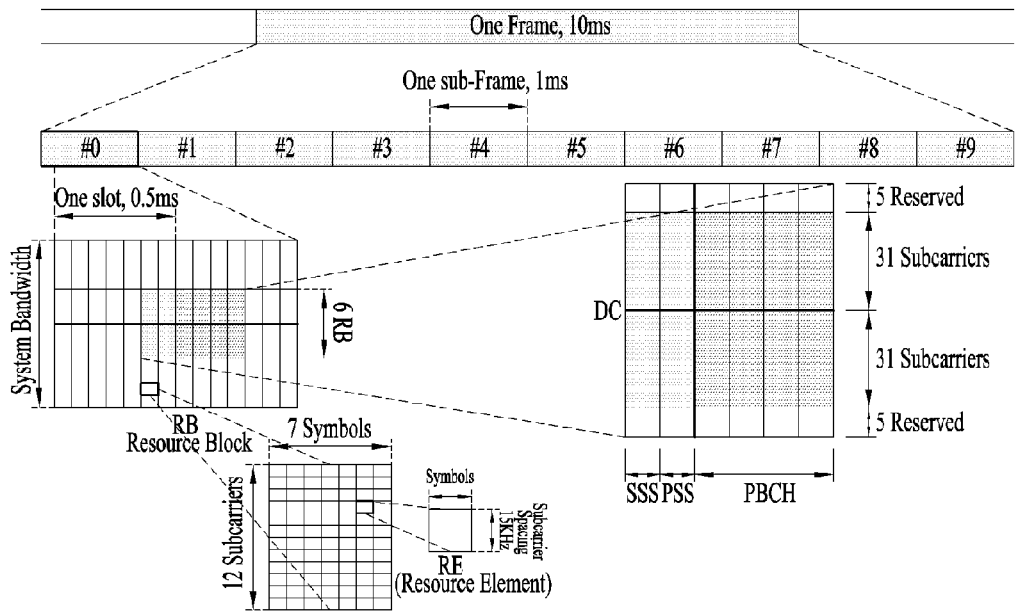
FIG. 3 is a diagram for LTE/LTE-A frame structure.

FIG. 3 is a diagram for LTE/LTE-A frame structure.

FIG. 3 shows a basic concept of a frame structure of LTE/LTE-A. One frame corresponds to 10 ms and includes ten 1-ms subframes. One subframe includes two 0.5-ms slots and one slot includes 7 OFDM (Orthogonal Frequency Division Multiplexing) symbols. One resource block (RB) is defined by 12 subcarriers each of which has 15 kHz space and 7 OFDM symbols. A base station delivers not only a primary synchronization signal (PSS) and a secondary synchronization signal (SSS) for synchronization but also a physical broadcast channel (PBCH) for system information in a center frequency (6RBs). In this case, it may have a difference in the frame structure and positions of the signal and the channel according to a normal/extended CP (cyclic prefix) and TDD (Time Division Duplex)/FDD (Frequency Division Duplex).

Figure 4:
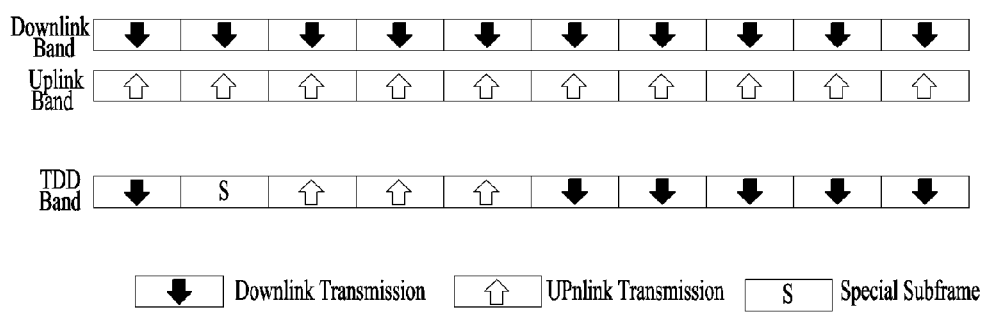
FIG. 4 is a diagram for an example of FDD/TDD frame structure in LTE/LTE-A system.

FIG. 4 is a diagram for an example of FDD/TDD frame structure in LTE/LTE-A system.

Referring to FIG. 4, in case of a FDD frame structure, a downlink frequency band is distinguished from an uplink frequency band. In case of a TDD frame structure, a downlink region is distinguished from an uplink region in a subframe unit in the same band.

Figure 5:
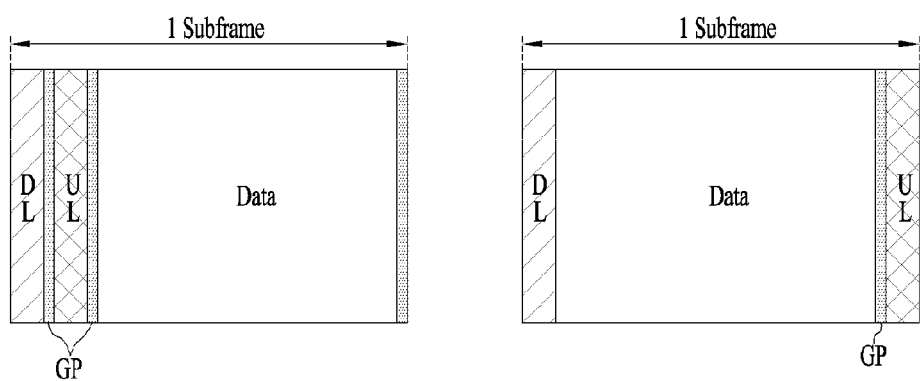
FIG. 5 is a diagram for an example of a self-contained subframe structure.

FIG. 5 is a diagram for an example of a self-contained subframe structure.

FIG. 5 shows a self-contained subframe structure which is proposed to satisfy a low-latency requirement among 5G performance requirements. A TDD-based self-contained subframe structure has a resource section for downlink, a resource section for uplink (e.g., a downlink control channel and an uplink control channel), a guard period (GP) for solving an interference problem between downlink and uplink, and a resource section for data transmission in a subframe.

FIG. 5 (a) shows an example of a self-contained subframe structure. A subframe is configured in an order of a resource section for downlink, a resource section for uplink, and a resource section for data and a GP exists between resource sections. In FIG. 5 (a), a downlink resource section represented as DL may correspond to a resource section for a downlink control channel and an uplink resource section represented as UL may correspond to a resource section for an uplink control channel.

FIG. 5 (b) shows a different example of a self-contained subframe structure. A subframe is configured in an order of a resource section for downlink, a resource section for data, and a resource section for uplink and a GP exists prior to an uplink resource section only. In FIG. 5 (b), a downlink resource section represented as DL may correspond to a resource section for a downlink control channel and an uplink resource section represented as UL may correspond to a resource section for an uplink control channel.

In the next generation 5G system, V2X, emergency service, and machine control targeting ultra-low latency, eMBB service targeting data speed, and the like are considered. Hence, it is necessary to design a frame structure capable of supporting low latency (OTA<1 ms) and high degree of freedom of DL/UL data. And, it is necessary to design a commonality-based frame structure which is not necessary to be redesigned in TDD or FDD operation scheme.

In a self-contained subframe structure, subcarrier spacing increases to support mobility 500 Km/h corresponding to 5G New RAT system requirement and TTI decreases to achieve low latency (i.e., OTA (w/ initiation)<1 ms) corresponding to 5G service requirement. For example, assume that subcarrier spacing increases to 75 kHz and TTI decreases to 0.2 ms. Then, due to mobility 500 km/h, coherence time is maintained by a single reference symbol within 0.2 ms TTI in a manner of decreasing coherence Time: $Tc=1/(2fd)\approx0.18$ ms. On the contrary, maximum r.m.s channel delay spread is maintained by 991 ns and Coherence Bandwidth: $Bc\_90\%=20$ kHz and $Bc\_50\%=200$ kHz are maintained. Hence, spacing between two reference symbols (RSs) should be maintained by 90 kHz.

Therefore, in order to perform channel estimation, it is necessary to assign RSs to the whole band. Yet, in this case, since at least 3 or more RSs are assigned for 3 channels including a DL control channel, a data channel, and a UL control channel, 3/14 overhead occurs. In order to improve the overhead problem, it is necessary to have a new scheme.

In order to provide low latency and degree of freedom of DL/UL data configuration of the next generation 5G system, the present invention proposes a new frame structure and a control zone configuration scheme. In the present specification, such a terminology as a zone indicates a resource. The zone can be used as a meaning identical to such a terminology as 'region' or 'channel'.

Figure 6A:
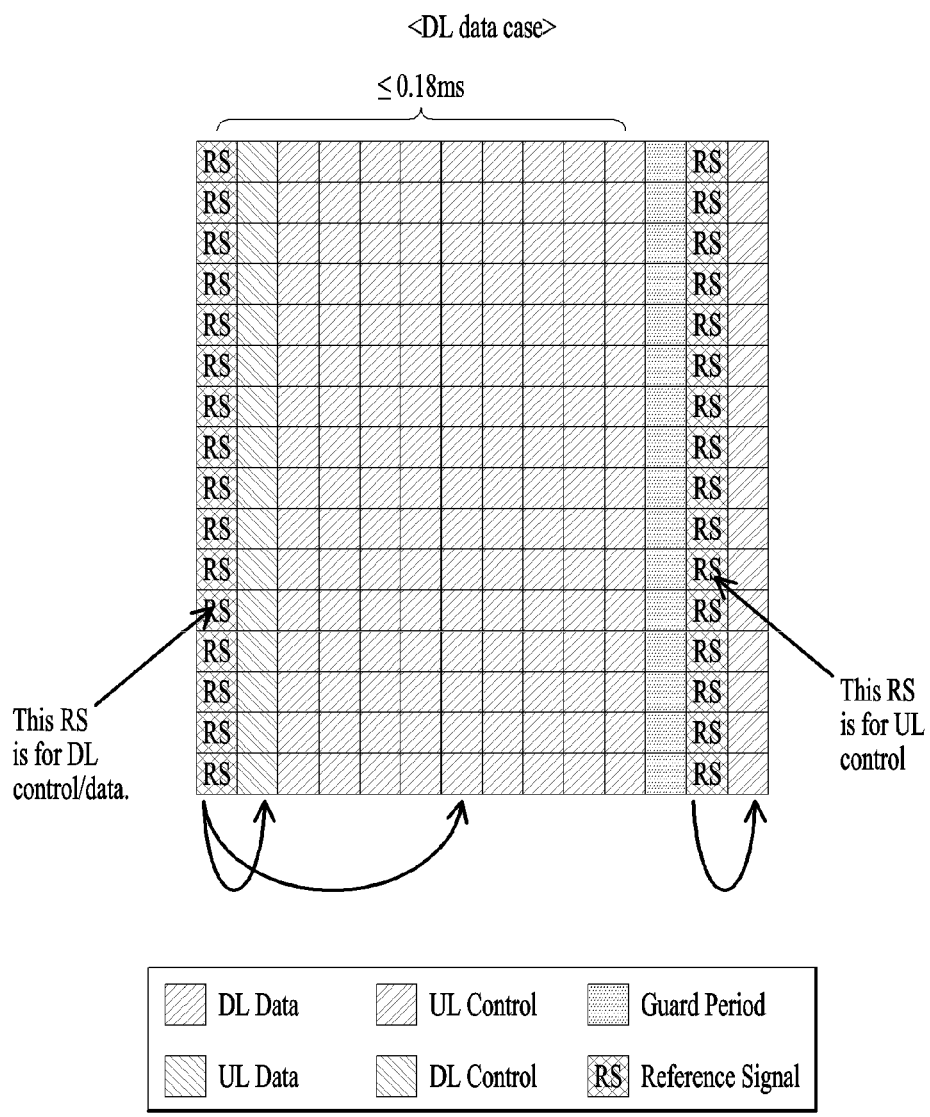
FIG. 6A is a diagram for an example of an RS assignment pattern when a resource region for DL/UL flexibility is allocated via a downlink data channel in a self-contained subframe and FIG. 6B is a diagram for an example of an RS assignment pattern when a resource region for DL/UL flexibility is allocated via an uplink data channel in a self-contained subframe.
Figure 6B:
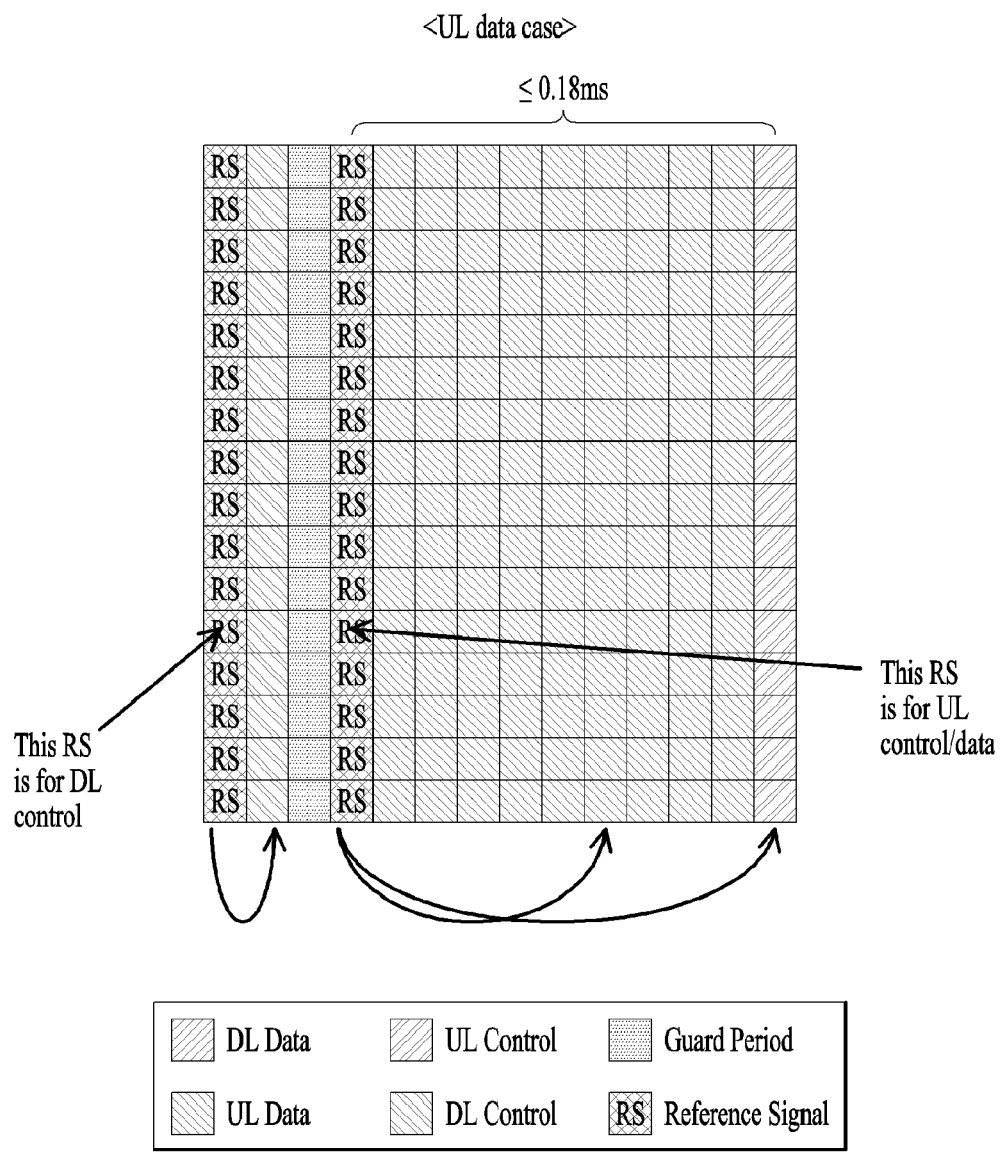

RS for Estimating Both a Control Channel and a Data Channel is Duplicately Used in an Identical Resource Region FIG. 6A is a diagram for an example of an RS assignment pattern when a resource region for DL/UL flexibility is allocated via a downlink data channel in a self-contained subframe and FIG. 6B is a diagram for an example of an RS assignment pattern when a resource region for DL/UL flexibility is allocated via an uplink data channel in a self-contained subframe.

FIG. 6A shows a frame structure when a data region corresponds to a downlink data region and FIG. 14b shows a frame structure when a data region corresponds to an uplink data region.

Referring to FIG. 6A, a first symbol and a second symbol of a subframe can be configured as a downlink control region. And, an RS for coherently demodulating DL control information can be assigned to the first symbol. In this case, the RS for coherently demodulating the DL control information (or a control channel) and an RS for coherently demodulating downlink data are mapped to the first symbol in a manner of being overlapped with each other. And, the last symbol of the subframe is assigned as an uplink control region and an RS for coherently demodulating uplink control information (or an uplink control channel) is located after a GP.

As shown in FIG. 6B, if a data region is allocated as an uplink data region, an RS for coherently demodulating downlink control information is located at the first symbol of a subframe in a downlink control region and an RS for uplink data and an RS for uplink control information are overlapped at the first part of the uplink data region after a GP. FIG. 14b shows an example that an RS for uplink data and an RS for uplink control information are mapped to a fourth symbol of a subframe in a manner of being overlapped. The RS assignment shown in FIGS. 6A and 6B can reduce RS resource overhead by half compared to a method of making RSs to be located at the control region and the data region, respectively.

In FIGS. 6A and 6B, although RS patterns are overlapped with each other at the first symbol, by which the present invention may be non-limited. For example, as shown in FIGS. 7A and 7B, overlap is available for various patterns and an RS overlap mapping technology is not limited by an RS assignment pattern.

Figure 7A:
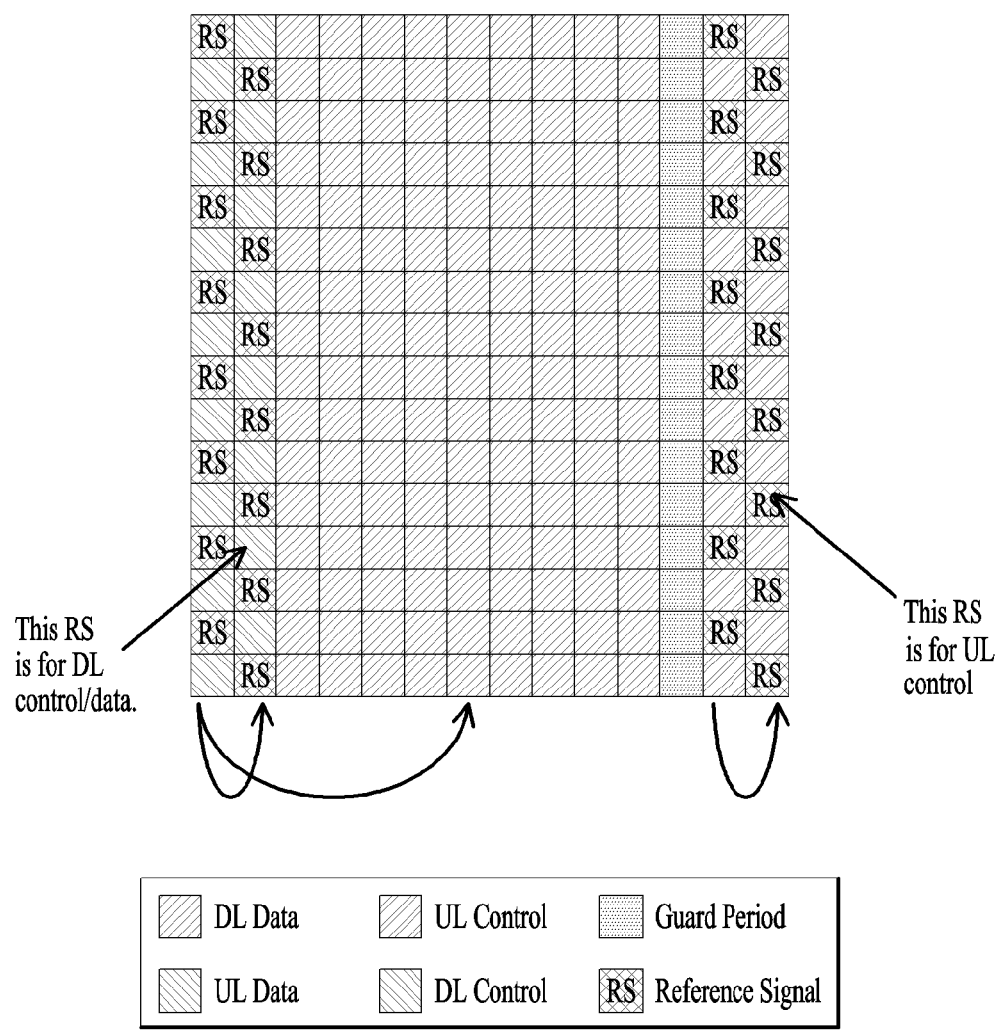
FIG. 7A is a diagram for an example of an RS assignment pattern when a resource region for DL/UL flexibility is allocated via a downlink data channel in a self-contained subframe and FIG. 7B is a diagram for an example of an RS assignment pattern when a resource region for DL/UL flexibility is allocated via an uplink data channel in a self-contained subframe.
Figure 7B:
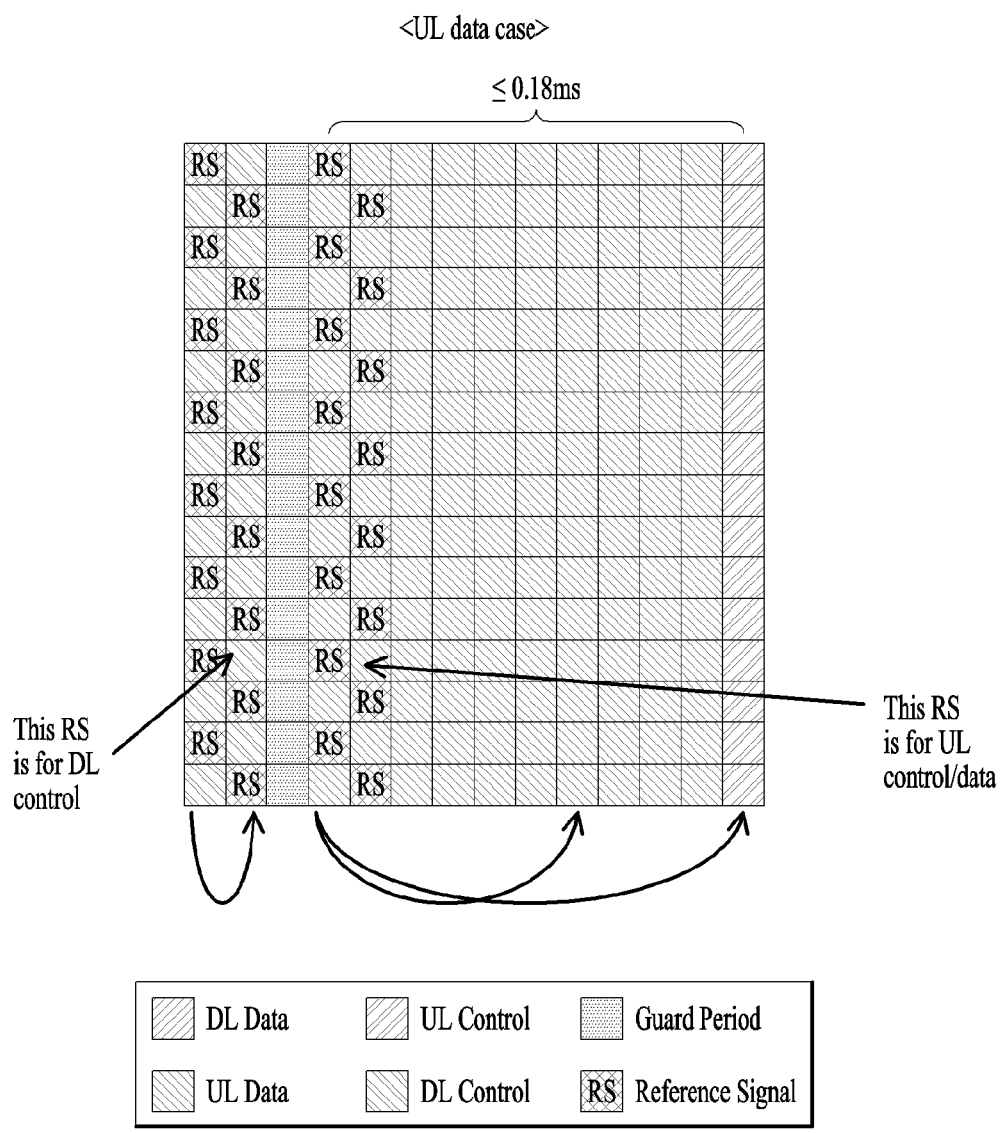

FIG. 7A is a diagram for an example of an RS assignment pattern when a resource region for DL/UL flexibility is allocated via a downlink data channel in a self-contained subframe and FIG. 7B is a diagram for an example of an RS assignment pattern when a resource region for DL/UL flexibility is allocated via an uplink data channel in a self-contained subframe.

Referring to FIG. 7A, an RS for coherently demodulating downlink control information and downlink data can be assigned to a first symbol and a second symbol of a subframe assigned as a downlink control region and an RS for coherently demodulating uplink control information can be assigned to the last two symbols of a subframe assigned as an uplink control region. Referring to FIG. 7B, an RS for coherently demodulating downlink control information can be assigned to a first symbol and a second symbol of a subframe assigned as a downlink control region and an RS for coherently demodulating uplink control information and uplink data can be assigned to two symbols appearing after a GP.

Moreover, a position of an RS in time domain can be arranged in a manner of being distributed to all time domains of data and control information. In this case, delay may occur when the control information is demodulated.

A procedure for a UE and an eNB to demodulate control information and data is described in the following. First of all, for clarity, an RS for control information and an RS for data are defined as C_RS and D_RS, respectively.

As Shown in FIGS. 6A and 7A, when Data Region is Assigned as Downlink Data Region (DL Control and DL Data)

eNB Operation

First of all, RE mapping is performed in a manner of generating control information entering into a control channel and C_RS for demodulation. In this case, the C_RS is mapped to an overlapped RS region. After DL data and D_RS for demodulating the DL data are generated, data is mapped to a resource region (or resource block) designated by DL control information. And, the D-RS and a C_RS for a control channel are transmitted to a UE in a manner of being overlapped in an overlapped RS region corresponding to the same frequency domain.

UE Operation

In order to detect downlink control information, a UE estimates a channel in an overlapped RS region using C_RS and may be then able to obtain the downlink control information using the estimated channel. The UE is able to know whether or not there exist data assigned to the UE based on the obtained downlink control information. If there exists data assigned to the UE, the UE performs channel estimation in the overlapped RS region using D_RS for a corresponding frequency domain position. The UE can detect the data assigned to the UE based on the channel estimation using the D_RS.

As Shown in FIGS. 6B and 7B, when Data Region is Assigned as Uplink Data Region (UL Data and Control)

UE Operation

First of all, assume that an eNB implicitly or explicitly allocates a UL data region and a UL control region to each UE. If both UL data region and UL control region are assigned to a UE, the UE generates data and D_RS, maps the data to an allocated DL data resource region, and maps the D_RS to an overlapped region.

And, the UE generates UL control information and C_RS, maps the UL control information to a UL control region, and maps the C_RS to an overlapped RS region in a manner of overlapping the C_RS with the D-RS.

When UL data is assigned to the UE only, in case of transmitting data only, the UE generates D_RS and maps the D_RS to an overlapped RS region assigned to the UE. On the contrary, when UL control information is assigned to the UE only, the UE maps the C-RS to an overlapped RS region corresponding to a region assigned to the UE.

eNB Operation

In order to detect UL control information and UL data of UEs, an eNB performs channel estimation based on C-RS or D_RS at a preassigned position.

When C_RS and D_RS are used in a manner of being overlapped in the same RS region, it is important to secure orthogonality between the RSs in terms of performance. A sequence can be configured in various ways using an orthogonal cover code (OCC), cyclic shift, or the like.

Figure 8:
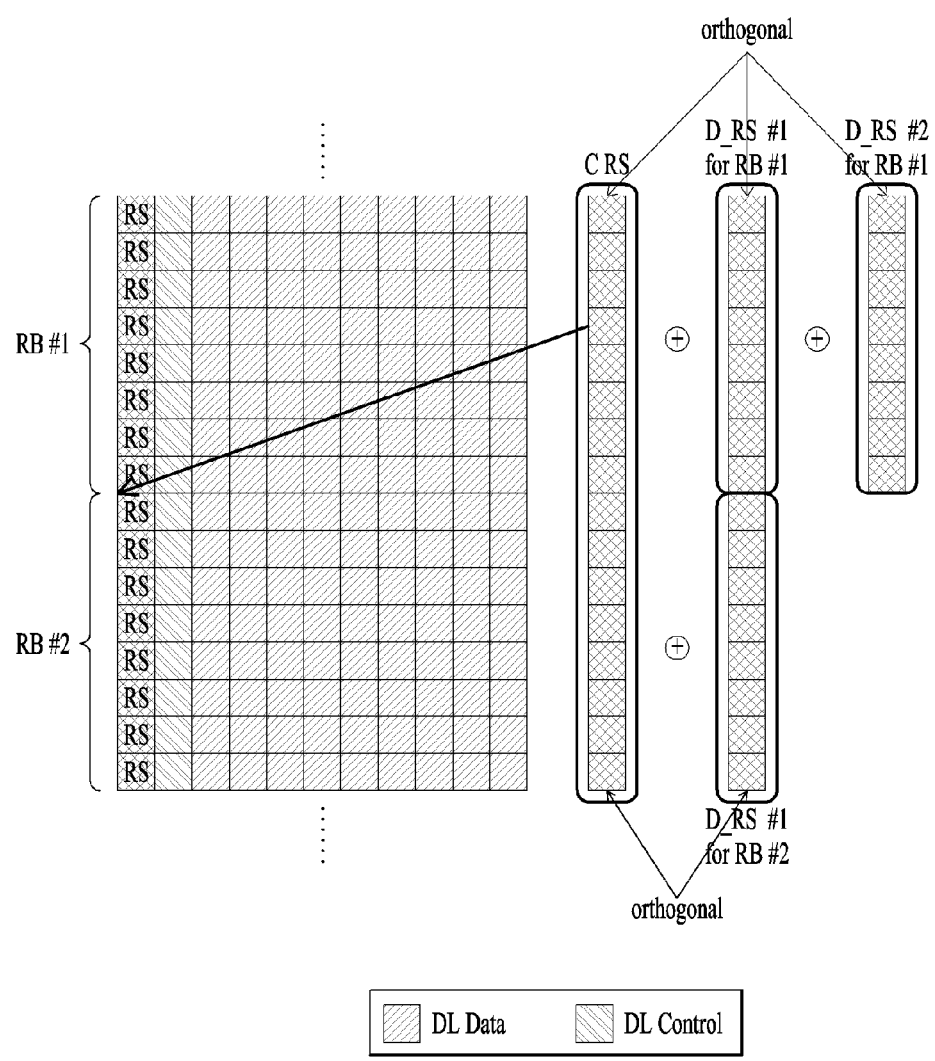
FIG. 8 is a diagram for a method of securing orthogonality between C_RS and D_RS when a data region is allocated to a downlink data region in a self-contained subframe structure.

FIG. 8 is a diagram for a method of securing orthogonality between C_RS and D_RS when a data region is allocated to a downlink data region in a self-contained subframe structure.

Referring to FIG. 8, two D_RSs (e.g., dual layer (D-RS #1 and D_RS #2)) are assigned to an RB (resource block) #1 and one D_RS is assigned to an RB #2. The total 3 RSs (i.e., C_RS, D_RS #1, and D_RS #2) are mapped in frequency domain of the RB #1 in a manner of being overlapped. In order to secure orthogonality for reception capability, sequences applied to a corresponding RS can be configured to have orthogonal characteristic. For example, if a cyclic shift value is differently configured according to each RS on the basis of a base sequence, it may be able to secure orthogonality in time domain. As a different method, it may be able to secure orthogonality in frequency domain by assigning sequences different from each other that maintain orthogonality in frequency domain.

It may also be able to configure the RB #2 using a cyclic shift or an OCC to secure orthogonality between the C_RS and the D_RS #1. A UE can detect C_RS-based DL control information based on the orthogonality and detect DL data using corresponding D_RS to detect a resource allocated to the UE.

In this case, the number of overlapped RSs may vary depending on the number of layers of the actually allocated blocks. And, a length unit of an RS can be extended to a plurality of RBs. In the following, a method of securing orthogonality using a cyclic shift value is explained with reference to FIG. 17 among the methods of securing orthogonality.

Figure 9:
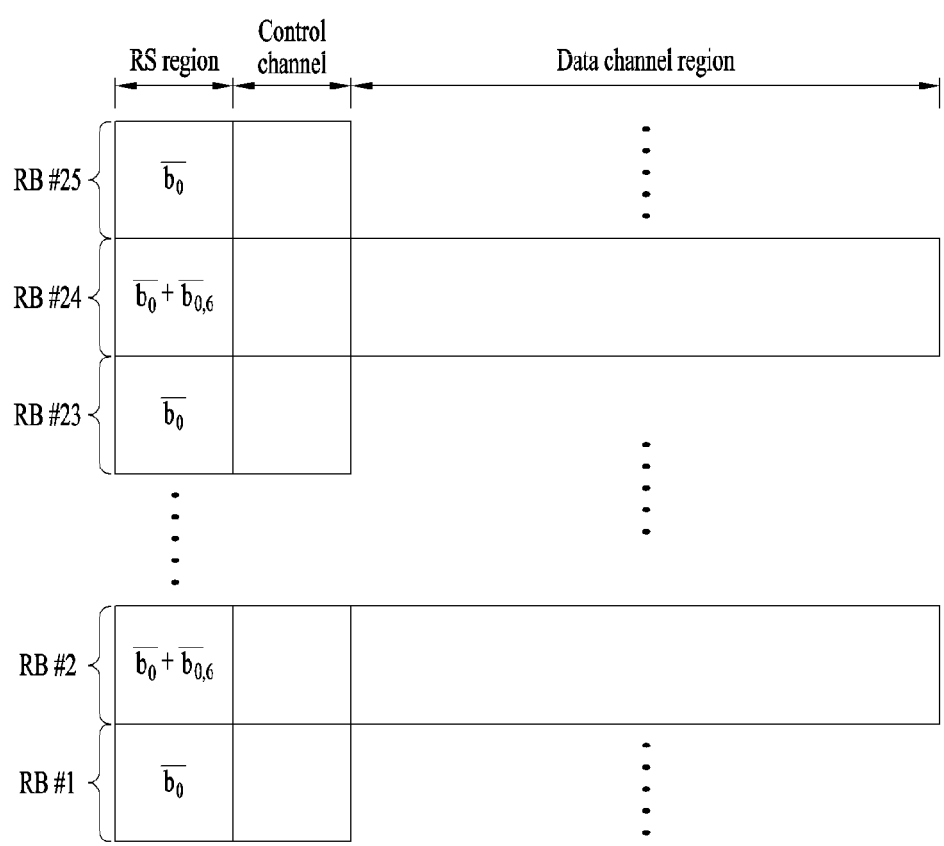
FIG. 9 is a diagram for explaining a case that a control channel is used for the whole band and a data channel is used for $24^{th}$ RB and $2^{nd}$ RB among 25 RBs in total.

FIG. 9 is a diagram for explaining a case that a control channel is used for the whole band and a data channel is used for $24^{th}$ RB and $2^{nd}$ RB among 25 RBs in total.

C_RS can be transmitted on the whole band of a resource to which a DL control channel is assigned. D_RS is mapped to a region to which the C_RS is mapped. The D_RS and the C_RS can be overlapped and mapped to a region to which DL data is assigned only (In FIG. 9, $2^{nd}$ and $24^{th}$ RBs only).

FIG. 9 shows a method of configuring a sequence using a base sequence and cyclic shift (CS) according to an RB. For clarity, assume that a base sequence to which CS is to be applied and a sequence to which cyclic shift value m is applied are defined as $\overline{b_0}$ and $\overline{b_{0,m}}$, respectively. And, assume that a symbol length and the number of subcarriers per RB correspond to $N_{sym}$ and $N_{sc}$, respectively. Hence, it may be able to secure orthogonality in time domain in a manner of applying a CS values ranging from 0 to maximum $N_{sc}-1$.

As shown in FIG. 9, a base sequence $\overline{b_0}$ is applied to all RBs of C_RS and a CS value as much as 6 is applied to an RB index 24 and an RB index 2 to which data is assigned. The C_RS for demodulating a DL control channel can estimate a channel using a base sequence. In particular, since a channel impulse response is located at a part corresponding to a first $1/N_{sc}$ of the total symbol length $N_{sym}$ in time domain in every RB, it may be able to estimate a DL control channel using the part.

If it is able to know positions of assigned data through a DL control channel and the positions correspond to an RB index 2 and an RB index 24, since a channel impulse response is located at a part corresponding to $6/N_{sc} \sim 7/N_{sc}$ of the total symbol length $N_{sym}$ in time domain, it may be able to estimate a data channel using the part.

In this case, a size of a time window and an applied CS value (i.e., 6) can be applied by various values. For example, if the CS value is restricted by values including 0, 2, 4, . . . , $N_{sc}-2$, a region at which a channel impulse response is located can be increased to $2N_{sym}/N_{sc}$. And, a configuration of the value can be determined according to a channel delay spread value. And, when a channel delay spread value is big, if a value farthest from a base value 0 is selected as a CS value, it may be able to prevent a channel impulse response from being overlapped.

Hence, an eNB can inform a UE of a unit of increasing a CS value through higher layer signaling (e.g., RRC signal). And, the eNB can transmit a CS value applied to data to the UE in a manner of including the CS value in DCI (downlink control information). And, the method can also be extensively applied to RBG (resource block group).

As a method of determining a cyclic shift value, a CS value of C_RS and a CS value of D_RS can be configured to have a maximum space. Simultaneously, a space between C_RSs and a space between D_RSs can be configured to have a maximum space to more secure orthogonality.

Table 1 in the following shows an example when an RB reference $N_{sc}$ corresponds to 12.

TABLE 11

| # of C_RS | # of D_RS | CS values for C_RS | CS values for D_RS |
| --- | --- | --- | --- |
| 1 | 1 | 0 | 6 |
| 1 | 2 | 0 | {4,8} |
| 1 | 4 | 0 | {4, 6, 8, 10} |
| 2 | 2 | {0,6} | {3,9} |

TABLE 11-continued

| # of C_RS | # of D_RS | CS values for C_RS | CS values for D_RS |
|---|---|---|---|
| 2 | 4 | {0,6} | {2,4,8,10} |
| 4 | 1 | {0,2,4,8} | 10 |
| 4 | 2 | {0,2,6,10} | {4,8} |
| 4 | 8 | {0,3,6,9} | {1,2,4,5,7,8,10,11} |

As a method of determining a base sequence applied to C_RS and D_RS, a base sequence can be determined based on a cell ID or a subframe index to randomize inter-cell interference. UL data can also be configured by a method identical to a method of configuring DL data.

According to one embodiment of the present invention, it is able to reduce waste of an RS resource for detecting a data channel and a control channel in a self-contained frame structure and reduce decoding latency.

In the foregoing description, a method of overlapping reference signals for demodulating a control channel and a data channel is explained. In case of the overlapping method, it is necessary to know the number of layers or the number of ports (ranks) for a control channel and a data channel of a corresponding RS region to precisely estimate a channel. Hence, it is necessary for an eNB to inform a UE of information on a rank in advance through higher layer signaling (e.g., RRC signaling) or a physical layer control channel signal prior to a corresponding subframe. However, according to the method, since a transmission scheme of a different number of ports can be differently used for all data frequency domains and the information is necessary for a resource allocation region in every subframe, overhead increases. In particular, since a stand-alone scheme or a non-stand-alone scheme not performing cross scheduling is unable to notify the number of ranks, it is necessary to have a new solution.

Figure 10:
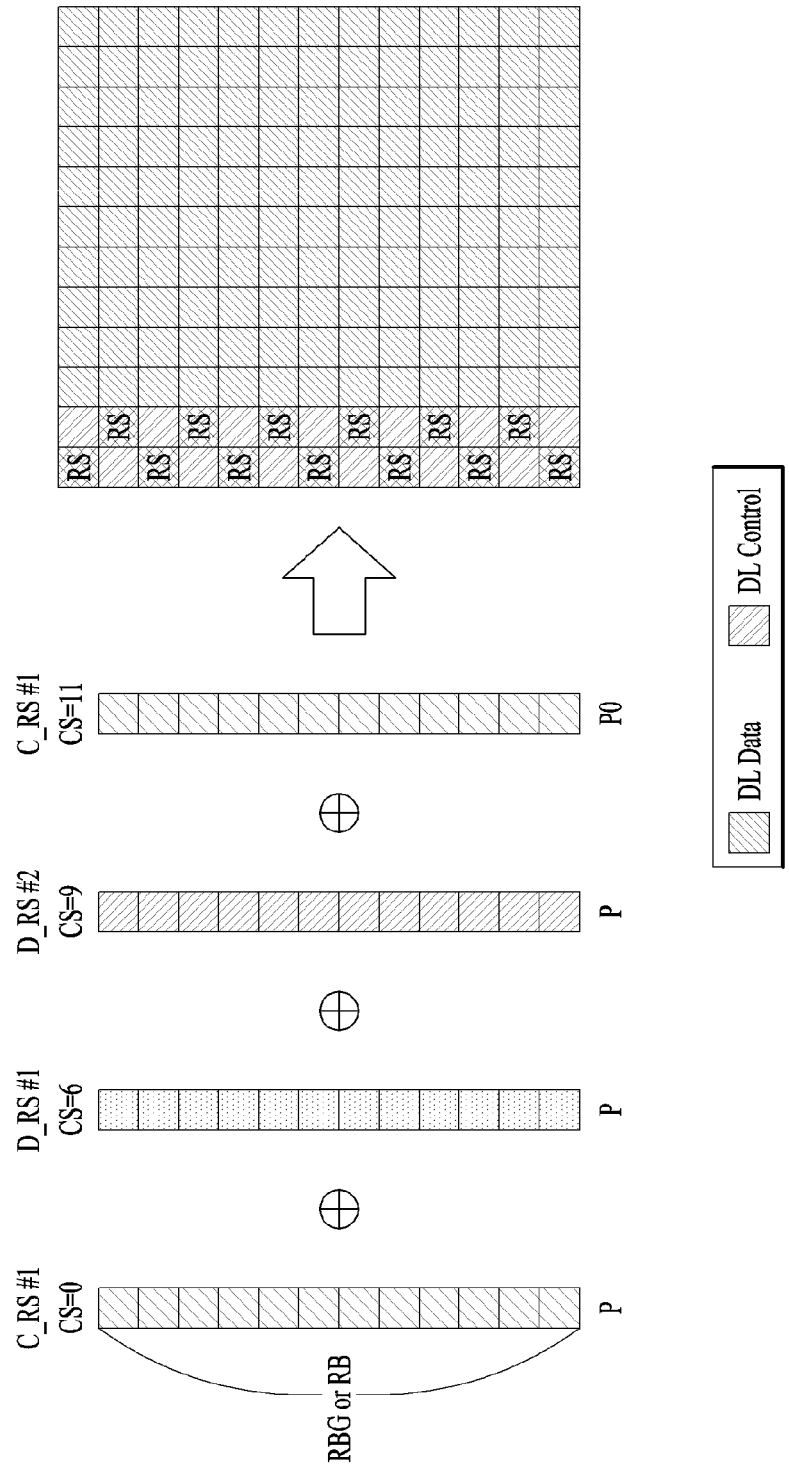
FIG. 10 is a diagram for an example that control information is transmitted by rank 1 (C_RS port #1) and data information is transmitted by rank 2 (D_RS #1, #2)

As a first scheme of the present invention to transmit reference signal (RS) for demodulating control channel and data channel, it may use an additional reference information signal in addition to a control RS (CRS) for transmitting control information FIG. 10 is a diagram for an example that control information is transmitted by rank 1 (C_RS port #1) and data information is transmitted by rank 2 (D_RS #1, #2).

Information necessary for the scheme proposed in FIG. 10 are described in the following.

(1) Port number of additional reference signal, CS value, and P0 value
(2) Power difference between C_RS and D_RS
(3) Power difference between D-RSs
(4) Total power of RS
(5) If a rank of C_RS is equal to or greater than 2, number of ranks of C_RS and/or power difference between C_RSs A transmitting end (e.g., eNB) can deliver the aforementioned information to a receiving end (e.g., UE) through system information, higher layer signaling, or the like.

The drawing shown in FIG. 10 corresponds to a resource grid that a horizontal axis corresponds to time domain and a vertical axis corresponds to frequency domain. In this case, assume that a UE is aware that control information transmitted by a rank 1 via system information. For example, the UE is able to obtain the number of ports used for transmitting control information by performing blind detection on a physical broadcast channel (e.g., PBCH).

According to the example shown in FIG. 10, in order to find out a rank used for transmitting data, an eNB transmits an identical C_RS (additional reference signal) having a different CS value (e.g., CS=11) by P0 power in addition to a C_RS port #1 using a cyclic shift (CS) value 0. If a rank of the received (5) C_RS is equal to or greater than 2, a UE is able to know a rank number of the C_RS and/or a power difference value between C_RSs according to information on the rank number of the C_RS and/or the power difference value between C_RSs. As shown in FIG. 10. the UE is able to know that a port number of the additional reference signal corresponds to 1 and CS corresponds to 11 based on the received information on (1) additional reference signal port number and CS value.

For example, as shown in FIG. 10, if a C_RS port or a rank number corresponds to 1, the UE can respectively estimate channels through an RS having a value of CS=0 and an RS having a value of CS=11, respectively. Since the channels on which the RS having the CS=0 value and the RS having the CS=11 value are transmitted are transmitted through an identical port, the channels have the same channel coefficient. Hence, a difference between estimation values of the two channels has a power difference only. And, since the power difference is determined according to a rank of D_RS, the number of ports of the D_RS and power can be calculated based on the power difference between the estimated two channels.

In FIG. 10, a method of determining the number of ranks of the D_RS is explained in the following. First of all, assume that (4) total power of RSs received by a UE corresponds to 10. In particular, assume that total power capable of being used for RSs corresponds to 10. And, assume that P0 value of an additional reference signal is configured by 1 (P0=1). And, the received information on (2) power difference between C-RS and D_RS may indicate that there is no difference between C_RS power and D_RS power. Then, the UE may assume that C_RS and D_RS use the power in a manner of equally dividing the power. And, if the received information on (3) power difference between D_RSs indicates that there is no difference between powers of D_RSs, the UE assumes that there is no power difference between the D_RSs. In this case, P corresponds to 3.

Then, a receiving end is able to know that a difference between CS=0 of a C_RS #1 and CS=11 RSs corresponds to P/P3=3. Based on this, since the receiving end knows that total power corresponds to 10 and P0 corresponds to 1, the receiving end is able to know that a rank of the D_RS corresponds to 2 and each power of the C_RS#1 of CS=0 and the D_RS of rank 2 (D_RS #1 and D_RS #2) corresponds to 3.

In FIG. 10, total power and P0 used for an additional reference signal can be differently configured according to a system. And, a CS value can also be differently used. And, it may also be able to consider a case that power of the C_RS and power of the D_RS are not equal.

As mentioned in the foregoing description, a UE is able to determine a rank number of D_RS based on information on an additional reference signal in addition to C_RS and may be able to perform decoding and demodulation on a control channel according to channel estimation using C_RS. The UE performs channel estimation using D_RS based on the determined rank number of the D_RS and may be able to perform decoding and demodulation on a data channel based on the channel estimation.

As a second scheme of the present invention to transmit reference signal (RS) for demodulating control channel and data channel, it may assign an additional reference signal to a region rather than an overlapped region to find out rank number.

Figure 11:
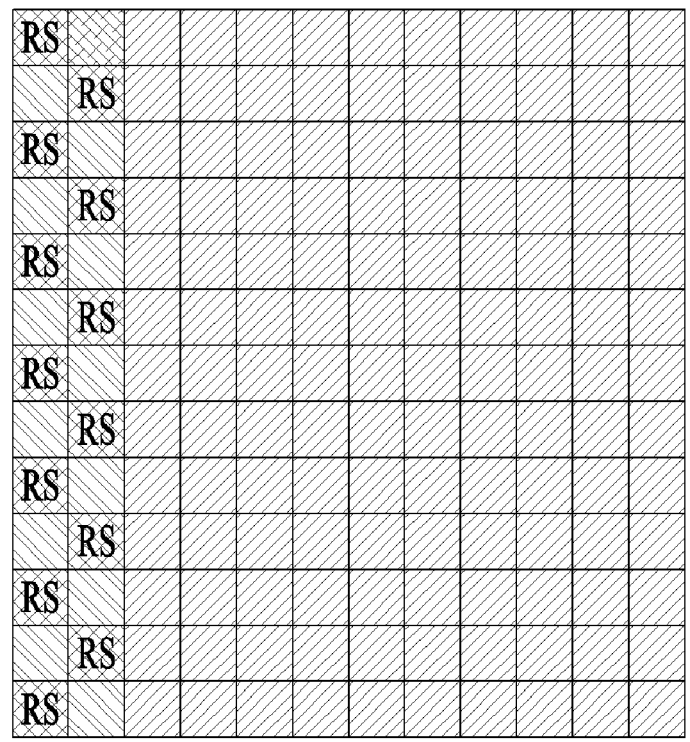
FIG. 11 is a diagram for an example of using a new RS to know a rank.

FIG. 11 is a diagram for an example of using a new RS to know a rank.

Unlike FIG. 10, FIG. 11 shows a method of newly allocating a resource for a new RS to find out a rank to a control region (or control channel). If an eNB transmits a new RS using specific power (P_RS) through C_RS port #1, a UE is able to find out a rank number using a channel estimation value of a legacy overlap region transmitted by a legacy C_RS port #1 and a power difference. The method of FIG. 11 has a merit in that it may be able to use a CS value as many as possible, but has a demerit in that resource element (RE) overhead entering into control region or data region is somewhat big.

As a third scheme of the present invention to transmit reference signal (RS) for demodulating control channel and data channel, it may configure a linkage between data resource region (RB (resource block) index, RBG (resource block group) index, subframe number) allocation and rank number.

Figure 12:
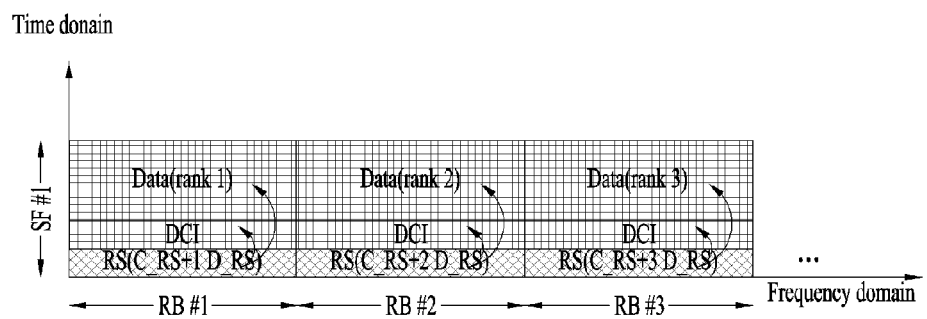
FIG. 12 is a diagram for explaining a method of finding out the number of data ranks used for a corresponding RB via a linkage between an RB index and a rank of data.

FIG. 12 is a diagram for explaining a method of finding out the number of data ranks used for a corresponding RB via a linkage between an RB index and a rank of data.

For example, an eNB can inform a UE that C_RS of rank 1 and D_RS of rank 1 are used for an RB #1, C_RS of rank 1 and D_RS of rank 2 are used for an RB #2, and C_RS of rank 1 and D_RS of rank 3 are used for an RB #3 through system information or higher layer signaling. Hence, when the UE performs channel estimation based on the C_RS of the RB #1, the UE is able to know that the D_RS of the rank 1 is overlapped. The UE can detect DCI information (DCI in the RB #1) by performing C_RS channel estimation.

And, the UE is already aware that rank 2 of data is used for the RB #2. When the UE performs channel estimation based on the C_RS of the RB #2, the UE is able to know that the D_RS of the rank 2 is overlapped. The UE can detect DCI information (DCI in the RB #2) by performing C_RS channel estimation.

And, the UE is already aware that rank 3 of data is used for the RB #3. When the UE performs channel estimation based on the C_RS of the RB #3, the UE is able to know that the D_RS of the rank 3 is overlapped. The UE can detect DCI information (DCI in the RB #3) by performing C_RS channel estimation.

In this case, although an example of using one C_RS is explained, the contents of FIG. 12 can be applied to a case of using a plurality of C_RSs as well.

Figure 13:
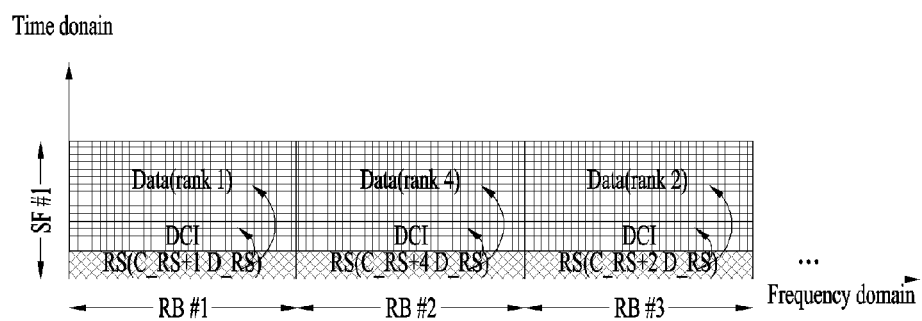
FIG. 13 is a diagram for explaining a different method of finding out the number of data ranks used for a corresponding RB via a linkage between an RB index and a rank of data.

FIG. 13 is a diagram for explaining a different method of finding out the number of data ranks used for a corresponding RB via a linkage between an RB index and a rank of data.

A linkage between an RB index and a data rank can be performed in various ways. For example, an eNB can inform a UE that C_RS of rank 1 and D_RS of rank 1 are used for an RB #1, C_RS of rank 1 and D_RS of rank 4 are used for an RB #2, and C_RS of rank 1 and D_RS of rank 2 are used for an RB #3 through system information or higher layer signaling. Hence, when the UE performs channel estimation based on the C_RS of the RB #1, the UE is able to know that the D_RS of the rank 1 is overlapped. The UE can detect DCI information (DCI in the RB #1) by performing C_RS channel estimation.

And, the UE is already aware that rank 4 of data is used for the RB #2. When the UE performs channel estimation based on the C_RS of the RB #2, the UE is able to know that the D_RS of the rank 4 is overlapped. The UE can detect DCI information (DCI in the RB #2) by performing C_RS channel estimation.

And, the UE is already aware that rank 2 of data is used for the RB #3. When the UE performs channel estimation based on the C_RS of the RB #3, the UE is able to know that the D_RS of the rank 2 is overlapped. The UE can detect DCI information (DCI in the RB #3) by performing C_RS channel estimation.

In this case, although an example of using one C_RS is explained, the contents of FIG. 13 can be applied to a case of using a plurality of C_RSs as well.

Figure 14:
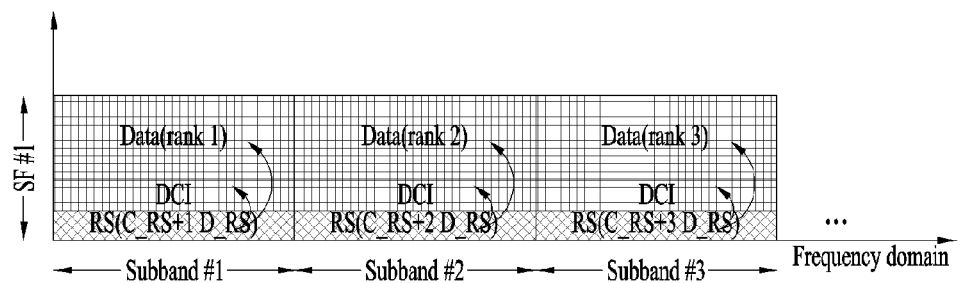
FIG. 14 is a diagram for explaining a method of finding out the number of data ranks used for a corresponding RB via a linkage between a subband index and a rank of data.

FIG. 14 is a diagram for explaining a method of finding out the number of data ranks used for a corresponding RB via a linkage between a subband index and a rank of data.

FIG. 14 shows a method of finding out the number of data ranks used for a corresponding RB via a linkage between a subband index and a rank of data. The contents mentioned earlier in FIG. 12 can be identically applied by replacing the RB index in FIG. 12 with the subband index.

Figure 15:
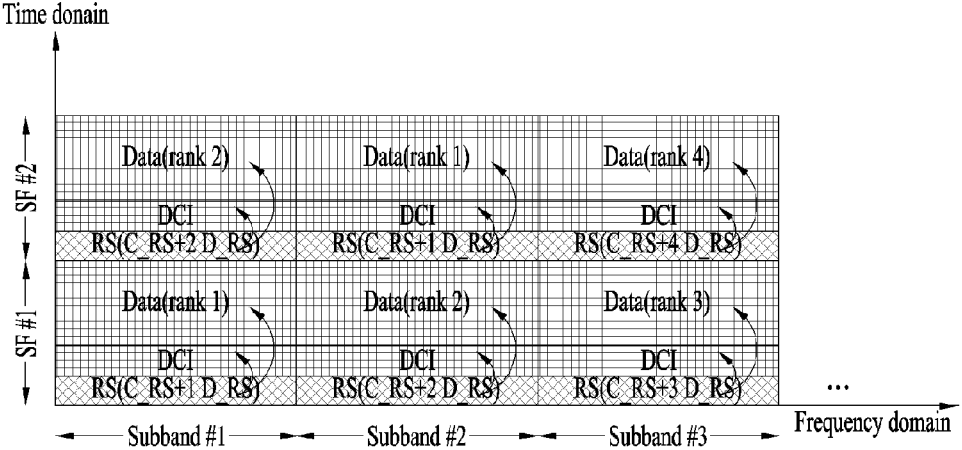
FIG. 15 is a diagram for an example of a linkage between a subband and a rank of data according to a subframe number (SFN).

FIG. 15 is a diagram for an example of a linkage between a subband and a rank of data according to a subframe number (SFN).

A linkage between a resource region and a rank may vary according to a subframe number (SFN). FIG. 5-6 shows an example that a different rank linkage is applied according to an SFN.

For example, in case of a subframe index 1 (SFN #1), an eNB can inform a UE that C_RS of rank 1 and D_RS of rank 1 are used for a frequency band index (e.g., subband #1), C_RS of rank 1 and D_RS of rank 2 are used for a subband #2, and C_RS of rank 1 and D_RS of rank 3 are used for a subband #3 through system information or higher layer signaling. Hence, when the UE performs channel estimation based on the C_RS of the subband #1, the UE is able to know that the D_RS of the rank 1 is overlapped. The UE can detect DCI information of the SFN #1 (DCI in the subband #1) by performing C_RS channel estimation.

For example, in case of a subframe index 2 (SFN #2), an eNB can inform a UE that C_RS of rank 1 and D_RS of rank 2 are used for a frequency band index (e.g., subband #1), C_RS of rank 1 and D_RS of rank 1 are used for a subband #2, and C_RS of rank 1 and D_RS of rank 3 are used for a subband #3 through system information or higher layer signaling. Hence, when the UE performs channel estimation based on the C_RS of the subband #1, the UE is able to know that the D_RS of the rank 2 is overlapped. The UE can detect DCI information of the SFN #2 (DCI in the subband #1) by performing C_RS channel estimation.

In this case, although an example of using one C_RS is explained, the contents of FIG. 15 can be applied to a case of using a plurality of C_RSs as well.

As mentioned earlier in FIG. 15, when a subband and a data rank are linked according to an SFN, it may be able to have a merit in that there is no additional RS overhead for finding out a rank. Yet, if the number of data ranks is changed according to an SFN, it may have a demerit in that performance deterioration may occur due to scheduling constraint.

As mentioned in the foregoing description, it is able to considerably reduce signaling overhead, which is necessary to be notified all the time, by finding out rank information for channel estimation through an additional RS.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for demodulating a channel by a user equipment in a wireless communication system, the method comprising:
   receiving, from an eNode B (eNB), information containing a total power value of reference signals (RSs), a power difference value between a power of a first RS reference signal for control information and a power of a second RS for data among the RSs, a port number of an additional RS, a cyclic shift (CS) value of the additional RS, a power value of the additional RS and a power difference value between second RSs for the control information;
   performing channel estimation on a first channel on which the additional RS is received and a second channel received from a port identical to the port number of the additional RS and on which the first RS to which a CS value different from the CS value of the additional RS is applied is received;
   obtaining a power difference value between the power of the additional RS and the power of the first RS based on the channel estimation of the first and the second channels; and
   determining a number of rank of the second RS based on the total power value of the RSs, the power value of the additional RS, the power difference value between the power of the first RS and the power of second RS, the obtained power difference value between the power of the additional RS and the power of the first RS, and the power difference value between the second RSs.

2. The method of claim 1, wherein the determining step further comprises the steps of:
   determining a remaining power value by subtracting the power value of the additional RS from the total power of the RSs; and
   determining the number of rank of the second RS using the remaining power value, the power difference value between the power of the first RS and the power of the second RS, the obtained power difference value between the power of the additional RS and the power of the first RS, and the power difference value between the second RS.

3. The method of claim 1, further comprising:
   demodulating a control channel and a data channel based on the determined number of rank of the second RS.

4. The method of claim 1, wherein if the determined number of rank of the second RS corresponds to a plural number, CS values applied to the second RSs are different from each other.

5. The method of claim 1, wherein the first RS and the second RS are received through a control channel.

6. The method of claim 1, wherein the information further comprises information regarding a number of rank of the first RS, and
   wherein the number of rank of the second reference signal is determined further based on the information regarding the number of rank of the first RS.

7. The method of claim 1, wherein the information is configured per frequency band.

8. The method of claim 7, wherein the frequency band corresponds to a frequency band of an resource block (RB) unit or a subband unit.

9. The method of claim 1, wherein the information is configured per subframe.

10. A user equipment for modulating a channel in a wireless communication system, the user equipment comprising:
    a receiver configured to receive, from an eNode B (eNB), information containing a total power value of reference signals (RSs), a power difference value between power of a first RS for control information and a power of a second RS for data among the RSs, a port number of an additional RS, a cyclic shift (CS) value of the additional RS and a power value of the additional RS, and a power difference value between second RSs for the control information; and
    a processor configured to:
      perform channel estimation on a first channel on which the additional RS is received and a second channel received from a port identical to the port number of the additional RS and the second channel on which the first RS to which a CS value different from the CS value of the additional RS is applied is received,
      obtain a power difference value between the power of the additional RS and the power of the first RS based on the channel estimation of the first and the second channels; and
      determine a number of rank of the second RS based on the total power value of the RSs, the power value of the additional RS, the power difference value between the power of the first RS and the power of second RS, the obtained power difference value between the power of the additional RS and the power of the first RS, and the power difference value between the second RSs.

11. The user equipment of claim 10, wherein the processor is further configured to:
    determine a remaining power value by subtracting the power value of the additional RS from the total power of the RSs; and
    determine a number of rank of the second RS using the remaining power value, the power difference value between the first RS and the second RS, the obtained power difference value between the power of the additional RS and the power of the first RS, and the power difference value between second RSs.

12. The user equipment of claim 10, wherein the processor is configured to demodulate a control channel and a data channel based on the determined number of rank of the second RS.

13. The user equipment of claim 10, wherein if the determined number of rank of the second RS corresponds to a plural number, CS values applied to the second RSs are different from each other.

14. The user equipment of claim 10, wherein the receiver is configured to receive the first RS and the second RS through a control channel.

15. The user equipment of claim 10, wherein the information further comprises information regarding a number of rank of the first RS and wherein the processor is configured to determine the number of rank of the second RS further based on the information regarding the number of rank of the first RS.

16. The user equipment of claim 10, wherein the information is configured per a frequency band.

17. The user equipment of claim 16, wherein the frequency band corresponds to a frequency band of a resource block (RB) unit or a subband unit.

18. The user equipment of claim 10, wherein the information is configured per subframe.

* * * * *